: 2,908,616
Patented Oct. 13, 1959

2,908,616

PRODUCTION OF PREDNISOLONE BY SEQUENTIAL FERMENTATION

Gilbert M. Shull, Huntington Station, N.Y., assignor to Chas. Pfizer & Co., Inc., New York, N.Y., a corporation of Delaware No Drawing. Application July 27, 1955
Serial No. 524,818

1 Claim. (Cl. 195—51)

This invention is concerned with a method for preparing prednisolone ($\Delta^{1,4}$-pregnadien-11$\beta$,17$\alpha$,21-triol-3,20-dione).

In U.S. Patent Number 2,658,023, there is described a method for preparing Kendall's Compound F ($\Delta^4$-pregnene-11$\beta$,17$\alpha$,21-triol-3,20-dione) from Reichstein's Compound S ($\Delta^4$-pregnene-17$\alpha$,21-diol-3,20-dione), by means of an organism of the genus Curvularia. In copending application Serial Number 483,842, filed January 24, 1955, there is described a method of producing prednisolone by the fermentation of Compound F with an organism of the genus Mycobacterium. It has now been found that prednisolone is produced directly from Compound S by subjecting Compound S, without isolation of an intermediate steroid product, to fermentation with an organism of the genus Curvularia and an organism of the genus Mycobacterium. This is a very desirable but unexpected result. The process of this present invention is desirable because it results in improvement in the overall yield of prednisolone from Compound S. It is also desirable in that it eliminates the need for purification of Compound F, the intermediate. The simplicity of operation of this new invention is such that there is a considerable saving when the invention is applied to large scale commercial production.

It was not to be expected that the process of this invention could be carried out readily. It is well known that it is often impossible to grow two different kinds of microorganisms together. Often the metabolites produced by one are antagonistic to the growth of the other, and often different nutrient media are required. Organisms of the genus Curvularia, which are fungi of the order Moniliales of the class Fungi Imperfecti, are very different from organisms of the genus Mycobacterium, which are not fungi but which belong to the order Mycobacteriaceae. Organisms of the genus Curvularia are relatively fast growing, but organisms of the genus Mycobacterium are relatively slow growing. Generally, for purposes of industrial fermentations, a single organism is desired, and it was unexpected that the two could be used together in a single fermentation. Furthermore, for some unknown reason, a better overall yield in the dehydrogenation step caused by organisms of the genus Mycobacterium is obtained here than when crystalline Compound F is fermented directly with Mycobacterium.

It is an object of this invention to provide a single step fermentation process for the commercial production of prednisolone by fermenting Compound S with an organism of the genus Curvularia and an organism of the genus Mycobacterium. This object may be accomplished in one of three ways. (1) Compound S is first subjected to fermentation with an organism of the genus Curvularia and then, without recovering the intermediate Compound F, the broth is inoculated with an organism of the genus Mycobacterium. This method seems to give the best results. (2) A second, and also a preferred method, comprises fermenting Compound S with a mixed culture of an organism of the genus Curvularia and an organism of the genus Mycobacterium. (3) A third alternative comprises fermenting Compound S with an organism of the genus Mycobacterium and then, without recovering the intermediate dehydrogenated product, subjecting the broth to fermentation with an organism of the genus Curvularia.

It has been found that no special medium is required to grow both Curvularia and Mycobacterium. Several satisfactory media are given in the following examples. In general there are required carbohydrates, a source of nitrogen, and traces of salts. Room temperature, say 25° C., may conveniently be employed, but it is generally most desirable to keep the cultures at about 28° C. Temperatures as high as about 37° C. are not harmful.

The following examples are given solely for the purpose of illustration and are not to be construed as limitations of this invention, many variations of which are possible without departing from the spirit or scope thereof.

EXAMPLE I

Growth of Curvularia-Curvularia lunata (NRRL-2380) was grown for two days in shake flasks on a soybean meal-$KH_2PO_4$ medium. One hundred cc. of the resulting vegetative growth was added to 2000 cc. of sterile medium of the following composition.

Medium CT-2

| | | |
|---|---|---|
| Corn steep liquor | g | 60.0 |
| Cerelose (dextrose hydrate) | g | 10.0 |
| Lactose | g | 20.0 |
| Corn meal | g | 12.0 |
| $Na_2SO_4$ | g | 1.0 |
| $CaCO_3$ | g | 5.5 |
| Soybean oil | cc | 2.0 |
| Tap $H_2O$ to make 1000 cc. | | |

After 20–24 hours stirring (1750 r.p.m.) and aeration (0.5 volume/volume of medium/minute) at 28°, the resulting broth was diluted with three volumes of sterile water and was inoculated with Mycobacterium phlei (ATCC 354) at the rate of 125 mg. of cells (dry weight) per 2000 cc. of diluted broth.

Mycobacterium inoculum: The vegetative growth of Mycobacterium phlei on a nutrient agar slant was transferred to Fernbach shake flasks each containing 1000 cc. of medium of the composition indicated below.

Medium CB-1

| | | |
|---|---|---|
| Nutrient broth (Difco) | g | 8.0 |
| Glycerol | cc | 20.0 |
| Tween 80 (Atlas Powder Co.) | cc | 0.2 |
| Distilled $H_2O$ to make 1000 cc. | | |

After two days' shaking at 28°, 10% of the resulting growth was transferred to shake flasks containing fresh medium of the same composition. After these flasks had shaken for approximately 60 hours at 28°, the dry weight of cells per unit volume was determined. Sufficient volume of the broth was then used in the diluted C. lunata broth to give the desired weight of cells.

Procedure: At the same time the diluted C. lunata broth was inoculated with M. phlei, 500 mg. of Reichstein's Compound S (either non-sterile or sterilized by ethylene oxide) was added.

The two organisms worked together in bringing about the conversion of S to prednisolone and other $\Delta^1$-dehydro compounds, particularly 14$\alpha$-hydroxyprednisolone, which may also be called $\Delta^{1,4}$-pregnadien-11$\beta$,14$\alpha$,17$\alpha$,21-tetrol-3,20-dione. A good yield of prednisolone was achieved in 60 hours.

EXAMPLE II

The procedure was similar to that in Example I except that Compound S to Compound F conversion was allowed to go to completion before the *M. phlei* was introduced. In this technique 500 mg. of Compound S was added to the diluted *C. lunata* broth and after approximately 12 hours, when all of the Compound S had been converted, the fermentation was filtered. The bulk of the Compound F remained in the filtrate. The filtrate was then replaced in the fermentor directly. Two thousand cc. of filtered broth was then inoculated with *M. phlei* and 100 cc. of a supplement CC-2, the composition of which is given below, was added.

Supplement CC-2

| | G. |
|---|---|
| $NH_4NO_3$ | 2.00 |
| $K_2HPO_4$ | 0.50 |
| $MgSO_4 \cdot 7H_2O$ | 0.50 |
| NaCl | 0.01 |
| $FeSO_4 \cdot 7H_2O$ | 0.0002 |
| $CaCO_3$ | 10.00 |
| Fumaric acid | 4.0 | pH adjusted to 6.9.
$H_2O$ to make 100 cc.

After 36 to 48 hours, the Compound F had been converted to prednisolone in good yield.

EXAMPLE III

*C. lunata* was grown for two days in shake flasks as in Example I. One hundred cc. of the resulting vegetative growth was added to 200 cc. of sterile medium of the following composition.

Medium CQ

| | G. |
|---|---|
| Soybean meal | 33.0 |
| $KH_2PO_4$ | 1.43 |

Tap $H_2O$ to make 1000 cc.

After 20–24 hours under stirred, aerated fermentation conditions, the broth was filtered and the mycelium filter cake washed briefly with water. The dry weight of a portion of the mycelium filter cake was determined. Sufficient moist mycelium was then suspended in 2000 cc. of $H_2O$ contained in a fermentor to represent 12.5 g. of mycelium on a dry weight basis. To this mycelium suspension is added 500 mg. of Compound S and the procedure from there on was exactly as outlined in Example II after the Compound S had been added to the diluted broth. A good yield of prednisolone was obtained.

EXAMPLE IV

The procedure was the same as Example I except that 0.05 M. phosphate (pH 7.0) was added to the diluted broth at the same time as the Compound S and the *M. phlei* inoculum. A good yield of prednisolone was obtained.

EXAMPLE V

The procedure was the same as Example II except that Supplement CC-2 was omitted and 0.05 M. phosphate (pH 7.0) was added at the same time as the *M. phlei* inoculum. A good yield of prednisolone was obtained.

EXAMPLE VI

The procedure was the same as Example III except that Supplement CC-2 was omitted and 0.05 M. phosphate (pH 7.0) was added at the same time as the *M. phlei* inoculum. A good yield of prednisolone was obtained.

EXAMPLE VII

The above procedures were repeated without change except that other species of Curvularia and other species of Mycobacterium were used. The species of Curvularia included *C. falcata*, *C. brachysporia* and *C. pallescens*. The species of Mycobacterium included *M. smegmatis*, *M. ranae*, *M. butyricum*, *M. berolinense*, *M. thanmopheos*, *M. lacticola*, *M. friedmanni* and *M. tuberculosis*. In each case, prednisolone was produced.

What is claimed is:

A process for the preparation of prednisolone comprising subjecting Reichstein's Compound S to fermentation with a mixed culture of an organism of the genus Curvularia and an organism of the genus Mycobacterium.

References Cited in the file of this patent

UNITED STATES PATENTS

| 2,602,769 | Murray et al. | July 8, 1952 |
| 2,658,023 | Shull et al. | Nov. 3, 1953 |
| 2,831,876 | Shull et al. | Apr. 22, 1958 |

OTHER REFERENCES

Bergey's Manual of Determinative Bacteriology, 6th edition, 1948, Williams and Wilkins, pp. 876, 877, 890, 891.

Visher et al.: Experientia, IX, 10, 1953, pp. 371–372.

Fried et al.: Jour. Am. Chem. Soc., 75, No. 20, 1953, pp. 5764, 5765.

Peterson et al.: J.A.C.S., 75, pp. 5768–5769.